US008919028B2

(12) United States Patent
Young

(10) Patent No.: US 8,919,028 B2
(45) Date of Patent: Dec. 30, 2014

(54) MOVING DECOY AND METHOD

(76) Inventor: Robert Jeffrey Young, Beaver Dam, KY (US)

( * ) Notice: Subject to any disclaimer, the term of this patent is extended or adjusted under 35 U.S.C. 154(b) by 726 days.

(21) Appl. No.: 12/977,163

(22) Filed: Dec. 23, 2010

(65) Prior Publication Data

US 2011/0146132 A1 Jun. 23, 2011

Related U.S. Application Data

(60) Provisional application No. 61/289,636, filed on Dec. 23, 2009.

(51) Int. Cl.
*A01M 31/06* (2006.01)

(52) U.S. Cl.
CPC ................... *A01M 31/06* (2013.01)
USPC ............................................ 43/3

(58) Field of Classification Search
USPC .......................................... 43/2, 3
See application file for complete search history.

(56) References Cited

U.S. PATENT DOCUMENTS

| 1,859,268 | A | | 5/1932 | Larson | |
|---|---|---|---|---|---|
| 2,793,456 | A | * | 5/1957 | Argo | 43/3 |
| 2,953,869 | A | | 9/1960 | Collischan | |
| 4,422,257 | A | | 12/1983 | McCrory | |
| 4,535,560 | A | | 8/1985 | O'Neil | |
| 4,910,905 | A | | 3/1990 | Girdley et al. | |
| 5,375,363 | A | * | 12/1994 | Higdon | 43/3 |
| 5,974,720 | A | | 11/1999 | Bowling | |
| 6,021,594 | A | * | 2/2000 | Krueger | 43/2 |
| 6,138,396 | A | | 10/2000 | Capps | |
| 6,216,382 | B1 | * | 4/2001 | Lindaman | 43/2 |
| 6,412,209 | B1 | * | 7/2002 | Kapraly et al. | 43/3 |
| 6,643,971 | B2 | * | 11/2003 | Daniels | 43/3 |
| 6,845,586 | B1 | * | 1/2005 | Brock, IV | 43/3 |
| 7,322,144 | B2 | * | 1/2008 | Brewer | 43/3 |
| 2002/0178639 | A1 | * | 12/2002 | Daniels | 43/3 |
| 2004/0010957 | A1 | * | 1/2004 | Corbiere, Jr. | 43/3 |
| 2011/0023349 | A1 | * | 2/2011 | Hughes | 43/3 |

* cited by examiner

*Primary Examiner* — Kimberly Berona
(74) *Attorney, Agent, or Firm* — Berenato & White, LLC

(57) ABSTRACT

A moving decoy is provided. The decoy is connected to a actuator which causes the decoy to pivot. When positioned on the surface of a body of water, the decoy is capable of mimicking the movements of a live animal.

13 Claims, 9 Drawing Sheets

MOVING DECOY AND METHOD

CROSS-REFERENCE TO RELATED APPLICATIONS AND CLAIM TO PRIORITY

This application is related to provisional application Ser. No. 61/289,636, filed Dec. 23, 2009, the contents of which are incorporated by reference and to which priority is claimed.

FIELD OF THE INVENTION

The invention is directed to decoys suitable for hunting. More particularly, the invention is directed to a decoy that moves in a manner that simulates the natural movement, such as feeding, of waterfowl, such as ducks, geese and the like.

BACKGROUND

Hunting waterfowl, typically ducks, geese, or swans, using decoys has been practiced for centuries. Waterfowl are hunted for sport, food, and to acquire feathers and down. A common waterfowl hunting tactic is to remain in a stationary position hidden from view by a hunting blind. A hunter uses different methods to attract waterfowl to its location, such as using an attracting call, decoy, or a combination of the two.

Decoys shaped as lifelike replicas of waterfowl are placed in a target area to attract prey. For example, a hunter will place one or more decoys having the likeness of a duck or other waterfowl in a body of water, allowing the decoy(s) to float on the surface of the water where they may be seen by prey. The hunter may then wait nearby in hiding, such as behind a blind, hoping that the decoys will attract waterfowl to the target area.

Decoys are usually made of wood or plastic and are intricately painted to resemble various waterfowl. Decoys are typically designed to float in the water, though they may be attached to a post placed in the ground or tethered in some form to allow them to drift in a general area while permitting for their later retrieval.

SUMMARY

In accordance with a first aspect of the invention, a waterfowl attraction apparatus is provided. The apparatus features a decoy having opposite first and second ends, and an actuator operatively associated with the decoy to cause, upon activation of the actuator, pivotal movement of the decoy.

According to a second aspect of the invention, a waterfowl attraction apparatus is provided. The apparatus includes a support, a decoy having a head and a tail pivotally connected to the support, and a actuator operatively associated with the decoy. Upon activation, the actuator causes pivotal movement of the decoy.

A third aspect of the invention provides a method of attracting waterfowl. The method involves placing a decoy unit in a body of water, the decoy unit including a decoy body and an actuator operatively connected to the decoy unit, and activating the actuator to submerge at least one end of the decoy unit in the body of water.

Other aspects of the invention, including apparatus, systems, methods, and the like which constitute part of the invention, will become more apparent upon reading the following detailed description of the exemplary embodiments and viewing the drawings.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENT(S) AND EXEMPLARY METHOD(S)

Figure 1:
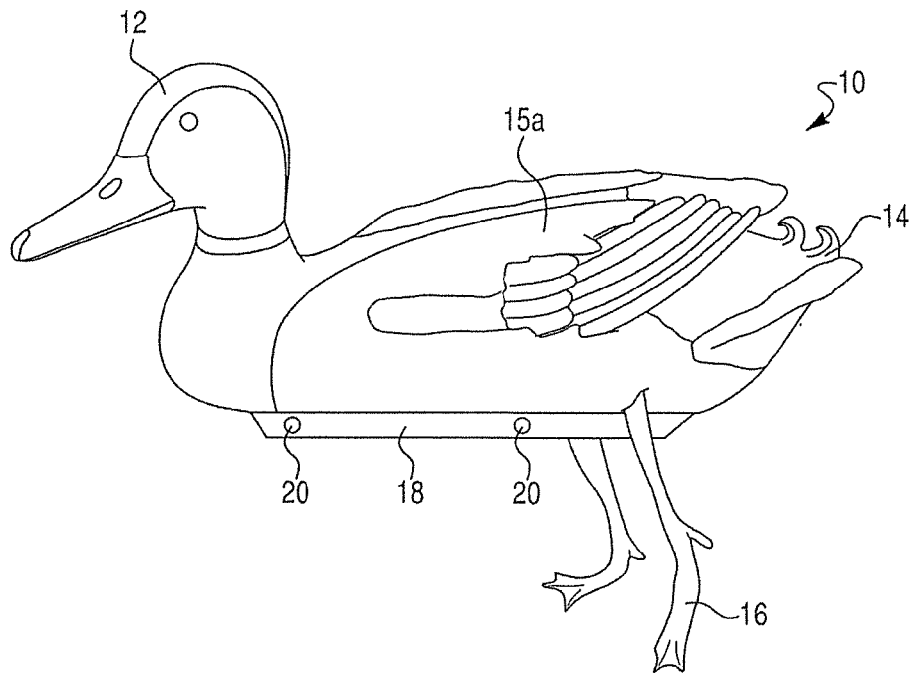
FIG. 1 is a side elevational view of a waterfowl decoy according to an exemplary embodiment of the invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

Figure 2:
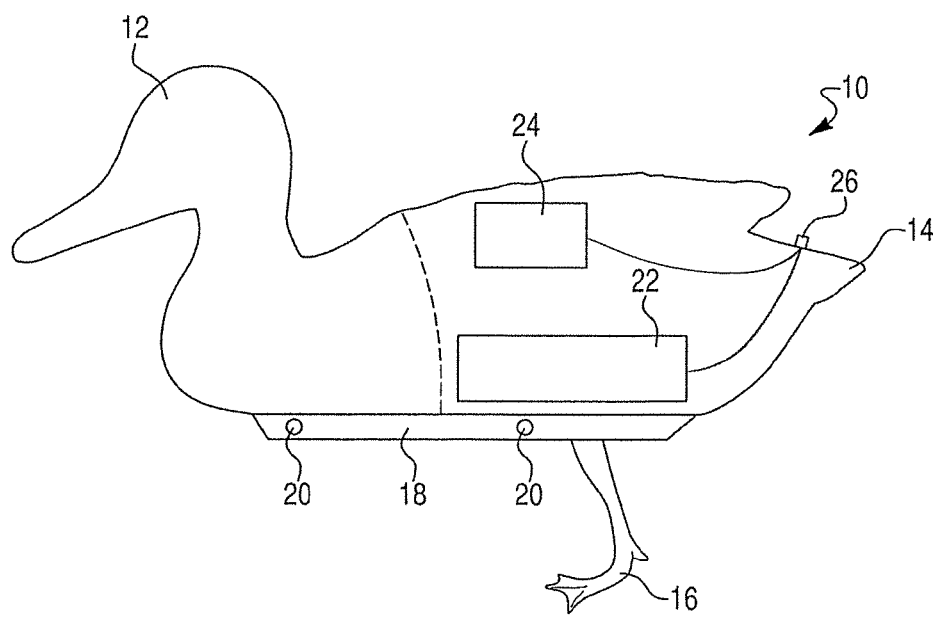
FIG. 2 is a partially sectioned view of the exemplary decoy of FIG. 1.

Although many traditional decoys closely replicate the still appearance of waterfowl, the decoys lack sufficient lifelikeness because they lack the capability of imitating the movements of real prey. FIGS. 1 and 2 illustrate an exemplary embodiment of a waterfowl decoy 10 which imitates the appearance and has the capacity to imitate the movements of real waterfowl. While the decoy 10 depicted in the figures has the appearance of a duck, any bird, or other animal forms, particularly those of waterfowl, may be used. The decoy 10 may be made from a variety materials including, for example, wood, plastic, metal, foam, composites, other materials, and combinations thereof. In an exemplary embodiment, the decoy 10 is sufficiently buoyant to float on water in such a manner as to give the appearance of a fowl floating naturally on the water's surface.

As illustrated in FIG. 1, the decoy 10 includes a body replicating the appearance of a live waterfowl. The body of the decoy 10 of FIG. 1 includes a head 12, a tail end 14, wings 15a, and feet 16. Additional or fewer features may be present. The decoy 10 has a base 18 formed integrally with the body of the decoy 10. Alternatively, the base may be formed separately from and attached to the body of the decoy 10. The base 18 has a number of holes 20 for connecting the decoy 10 to various components of an actuator and/or support, examples of which are described in further detail below. The base 18 may be made from the same material as the body of the decoy 10 or from a different material. In an exemplary embodiment, the body of the decoy 10 is made from plastic and the base 18 is made from metal and connected to the body of the decoy 10 using fasteners, adhesive, etc.

As best illustrated in FIG. 2, the moving decoy 10 of this exemplary embodiment incorporates within the interior of decoy 10 an electric power supply 22 and an electronic controller 24 housed in the body of the decoy 10. The power supply 22 may be a battery, for example a 12 volt, lead-acid type battery, though a variety of other types of batteries, for example lithium or nickel based batteries, may be used. The power supply 22 can be rechargeable and means of connecting the power supply 22 to an electric charger may be provided, for example, through an electric outlet or connection on the decoy 10. Although not shown, the power supply 22 may be surrounded by a foam or other sealant or material to impart water resistance for protecting the power supply 22. The power supply 22 may also be sealed or otherwise waterproof.

The electronic controller 24 may contain electronic components for creating a timed and repeatable event or series of events. For example, the controller 24 may contain an electronic timing circuit which places the controller 24 in an ON state for a set amount of time and then switches to an OFF state. This cycle may be repeated at a determined interval or randomly. The electronic controller 25 may held in the ON state for a set amount of time or a random amount of time within the constraints of a defined time interval. Additionally, the amount of time the controller 24 is in the ON state, as well as the time between ON/OFF cycles, may be adjusted by a user. In an exemplary embodiment, upon initiation, the electronic controller 24 enters a cycle which has 4.5 seconds OFF, 0.9 seconds ON, 0.1 seconds OFF, and 0.2 seconds ON, after which the cycle repeats. As with the electric power supply 22, the electronic controller 24 may be covered with a foam material to impart water resistance, or be sealed or otherwise waterproof. In an exemplary embodiment, however, the decoy 10, or at least a portion thereof housing the electric power supply 22 and the electronic controller 24, is waterproof.

The body of the decoy 10 incorporates a switch 26 for activating the controller 24. The switch 26 may be a two-position switch, for example a push button or a toggle switch, which activates and deactivates the controller 24. In alternative embodiment, a multi-position switch or a digital switch may be used to allow for the selection of different modes or functions as needed. More than one switch 26 may also be provided for controlling the different modes or functions. The switch 26 may be waterproof or have a waterproof covering. The switch 26 is electrically connected to power supply 22 and to the controller 24. The decoy 10 may also have an opening (not shown) such as a panel which would allow access to the interior of the decoy 10. This may be used for the replacement or adjustment of the power supply 22 and the controller 24, as well as for customization of the decoy 10 by the addition of other components, for example, weights to affect the buoyancy of the decoy 10, or an audible device, such as an electronically generated call. Those skilled in the art will recognize that the controller 24 may be programmable in order to allow the user to either create an actuation sequence for operation of the switch or to select a desired sequence from a plurality of preset actuation sequences.

While the exemplary embodiment of FIGS. 1 and 2 shows the power supply 22, controller 24, and switch 26 placed internally in the body of the decoy 10, it should be noted that in various other embodiments these components may be secured to the exterior of the body of the decoy 10 or may be located remotely from the decoy 10, as discussed in further detail below.

Figure 3:
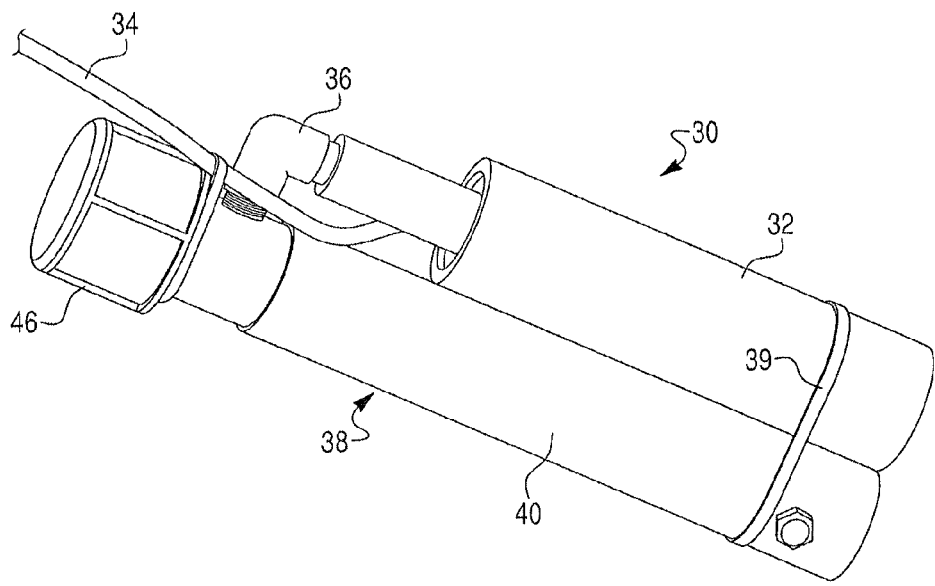
FIG. 3 is a perspective view of an actuator according to an exemplary embodiment of the invention.
Figure 4:
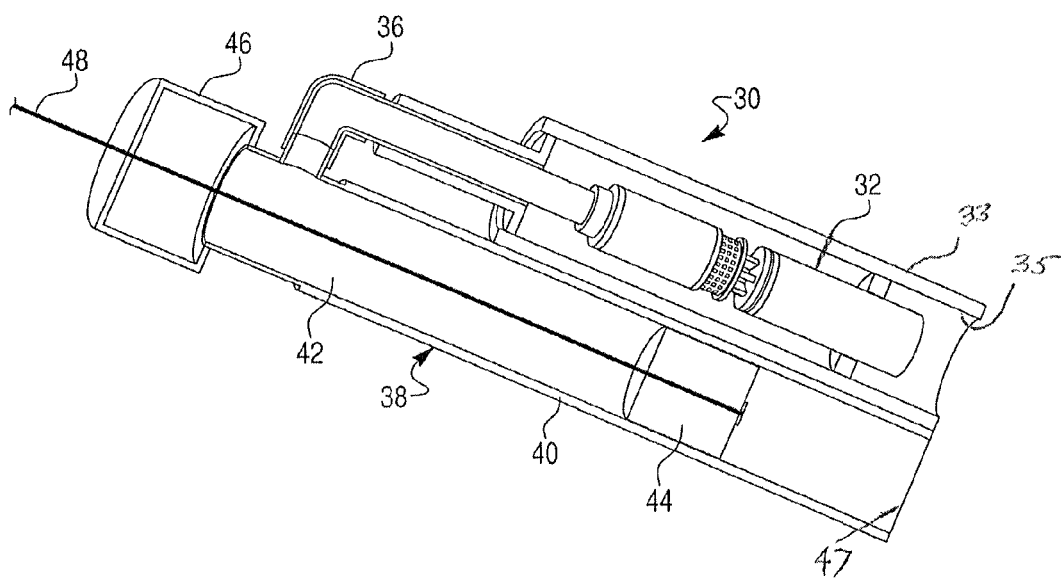
FIG. 4 is a perspective, sectional view of the exemplary actuator of FIG. 3.

FIGS. 3 and 4 depict an exemplary embodiment of an actuator 30 operatively associated with and controlled by the controller 24. The actuator 30 includes a pump 32, which may be a liquid or gas pump. In an exemplary embodiment the pump 32 is a submersible electrically operated direct current (DC) liquid pump, which uses an impeller (not shown) to draw liquid such as water through the pump housing 33 and discharge the liquid through a pump outlet. An example of such a pump 32 is a Rule®, model number iL200P, 12-volt submersible pump, the specification of which is available from the ITT Corporation and is hereby incorporated by reference. Housing 33 preferably has an open end 35 immersed in the water for supplying water to pump 32.

The actuator 30 has a cable 34 for attaching to external components, as shown in FIGS. 6-10. The cable 34 may comprise a plastic or elastomeric material encasing one or more electrical wires. In various exemplary embodiments where the power supply 22 and controller 24 are housed in the body of the decoy 10, the cable 34 may connect to the power supply 22, the controller 24, or the switch 26 by passing through a port or socket (not shown) on the body of the decoy 10. The cable 34 may also travel through the body of the decoy 10 and connect directly to the power supply 22, controller 24 and/or the switch 26. In other embodiments not illustrated in the accompanying drawings, the the power supply 22, the controller 24, and/or the switch 26 may be incorporated into the actuator 30 with the cable 34. In still another alternative embodiment, the power supply 22, the controller 24, and/or the switch may be positioned in a remote location, such as near the hunter, with the cable 34 connecting the actuator 30 to the power supply 22, the controller 24, the switch 26, or a combination thereof.

The controller 24 may have a four pin configuration, with a first pair of pins being the input from the power supply 22 and the second pair of pins being the output to the actuator 30. The power supply 22 provides power to the pump 32, either through a direct electrical connection or as power being passed through the controller 24. In the exemplary embodiment shown in FIGS. 6-10, the controller 24 controls the actuator 30 by cycling the pump 32 on and off.

As best illustrated in FIG. 4, the actuator 30 has a conduit 36 for passing fluid from the pump 32 to a housing 38. The conduit 36 and the housing 38 may be made from the same or different materials, which are not limited to plastic, metal, wood, or composites. The pump 32, conduit 36, and housing 38, may be formed integrally with one another, or they may be separate components that are attached together using adhesives, welding, threaded connections, friction fit, mechanical fasteners, or combinations thereof, etc. In an exemplary embodiment, the conduit 36 is made from a plastic material and is connected to the housing 38, which is a one inch diameter aluminum cylinder, by a threaded connection. The pump 32 may be attached to the housing 38 via a strap or band 39 (FIG. 3) for stability. The size of the conduit 36 may be adjusted depending on the flow rate of the pump 32 and the requirements of the overall device. In an exemplary embodiment the conduit 36 is approximately 0.5 inches in diameter.

In the exemplary embodiment illustrated in FIG. 4, the housing 38 includes an outer shell 40 surrounding an internal cavity 42. The housing 38 is depicted as a cylinder, though any number of shapes may be used. The housing 38 contains a piston 44 which may be made from a variety of materials including plastic, rubber, and metal. The piston 44 is sized to reciprocate inside the internal cavity 42 while maintaining an approximately fluid tight seal between the piston 44 and the outer shell 42. Optionally, a small amount of leakage may be overcompensated by the flow rate of the pump 32. In an exemplary embodiment, the piston 44 is made from nylon and is one inch in diameter and 0.75 inches long.

The housing 38 has a first end provided with an endcap 46 and a second open end 47. The endcap 46 may be attached to the first end of the housing 38 by an adhesive, welding, a threaded connection, a press fit connection, a mechanically fastened connection, etc.

In an exemplary embodiment, an actuator line 48 having a first end connected to the piston 44 extends through an opening in the endcap 46 to the decoy 10. The actuator line 48 may be connected to the piston 44 and decoy 10 by any suitable means, for example an adhesive or a mechanical fastener. In an exemplary embodiment, the actuator line 48 is strung through a hole in the piston 44, and the end of the actuator line 48 is knotted to secure it to the piston 44. An additional knot may be placed in front of the piston 44 to prevent the piston 44 from sliding forward along the actuator line 48. The actuator line 48 may be made from various materials, such as, for example, nylon, polyvinylidene fluoride, polyethylene, etc. In an exemplary embodiment, a monofilament material will be used for the actuator line 48. It should be noted that the term actuator line 48 is used in a general sense to describe any component which connects the decoy 10 and the actuator 30. Various exemplary embodiments may utilize a component which would not fall under the ordinary definition of the term "line," but still fall within the scope of the invention. These may include, but are not limited to, rods, springs, wires, or bands. The actuator line 48 may even be formed integrally with the piston 44.

Activation of the switch 26 places the controller 24 in the ON state, which causes the pump 32 to operate. In operation, the pump 32 draws liquid, for example water from the surrounding target area (e.g., pond) in which the pump 32 is submerged, through the back end of the pump 32. The pump 32 passes the liquid through the conduit 36 and into the housing 38 in communication with the conduit 36. As the internal cavity 42 of the housing 38 fills with liquid, the liquid pushes the piston 44 towards the back of the housing 47. In an exemplary embodiment, the piston 44 may be constructed to permit its rearward movement under pressures between 1-15 psi, for example.

When the controller 24 is switched to the OFF state, whether manually or via an automated cycle, the piston 44 moves forward through the internal cavity 42 towards endcap 46. The forward movement may be accomplished by the buoyancy of the decoy 10, or through other means, such as a biasing member (not shown) connected to the piston 44 or the actuator line 48. In an exemplary embodiment, the biasing member is a spring placed between the piston 44 and an end of the housing 38.

To allow the piston 44 to move forward, the liquid in the internal cavity 42 is vented. In an exemplary embodiment, the liquid contained in the internal cavity 42 is returned back through the conduit 36 and discharged out of the open end of the pump 32. Optionally, the liquid may also discharge from the internal cavity 42 by passing through an opening in the endcap 46 through which the actuator line 48 passes. Various exemplary embodiments may utilize release valves or ports. For example, a release valve (not shown) may be actuated by the controller 24. Vents or openings (not shown) may also be provided to prevent the housing 38 from becoming over pressurized, potentially resulting in damage to the device. These valves may be operated by the controller 24, or they may be automatic valves which activate when a certain pressure is reached. Alternatively, or in connection with release valves, the housing 38 possess an open back end 47. The open back end 47 allows the piston 44 to exit the housing 38 and fluid to escape the internal cavity 42. Holes or vents (not shown) may also be provided in the back end of the housing 38. As the piston 44 moves in the internal cavity 42 and passes these openings, the liquid will be vented outside of the housing 38 while the piston 44 remains in the internal cavity 42. Various other methods of releasing pressure from the internal cavity 42 will be understood by those of ordinary skill in the art upon viewing this disclosure.

Though a pump 32 is depicted in the accompanying drawings, the actuator 30 may include additional or alternative motion designs. Various exemplary embodiments may utilize other forms of hydraulic actuators, for example a gas actuator which utilizes an air pump or a self-contained gas canister, connected to or incorporated with the actuator 30. The actuator 30 may also utilize any combination of electrical, mechanical, and magnetic components. For example, a solenoid may be used to create a magnetic field, which in turn causes movement of the piston 44. Other types of linear actuators may include, but are not limited to, screw, rack and pinion, belt and pulley, cam, telescopic, and piezoelectric type actuators. Different actuators 30 may require different components, power supplies, and various limits or stops. Additionally, various modifications to, or the elimination of, controller 24 may also be needed depending on the actuator 30. The different types of actuators 30 that may be used, and the components and modifications that are required, will be understood by one of ordinary skill in the art upon viewing this disclosure.

Figure 5:
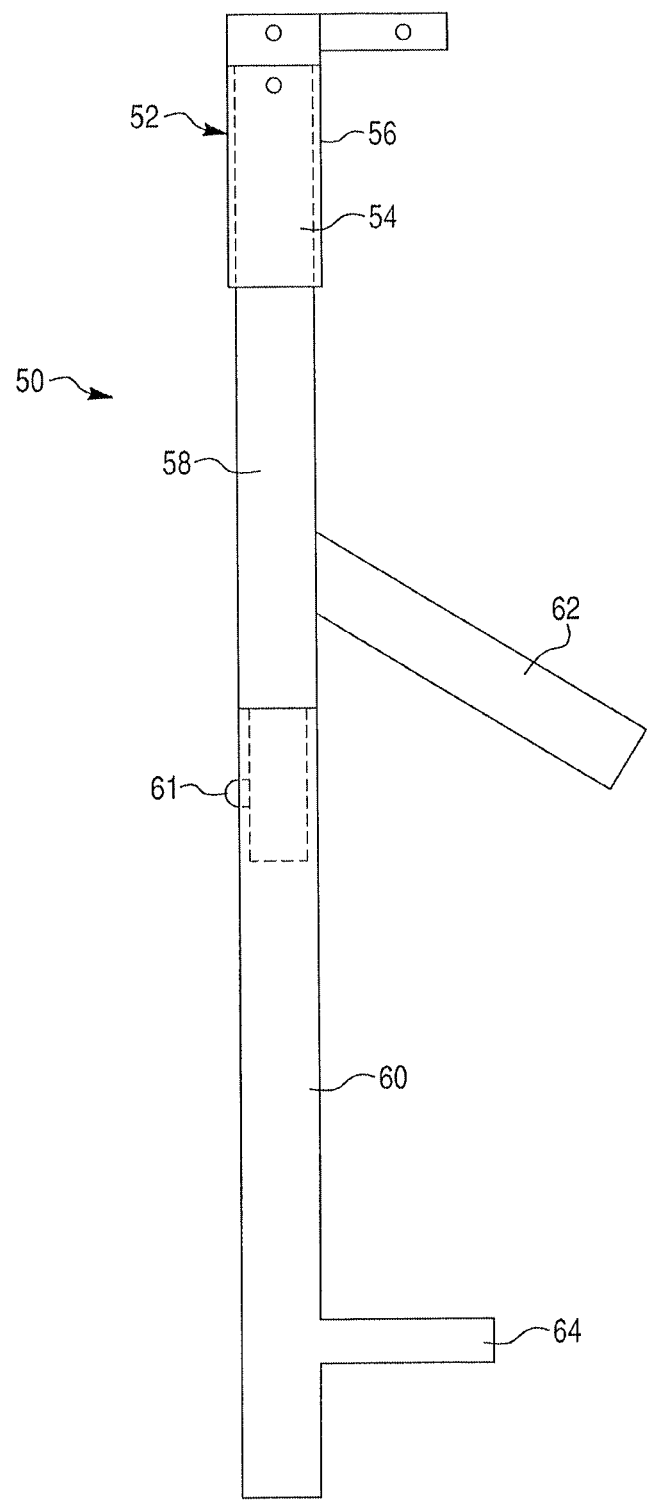
FIG. 5 is a plan view of a support member according to an exemplary embodiment of the invention.

FIG. 5 shows an exemplary embodiment of a support (also referred to herein as a stand) 50. The support 50 may be made from a variety of materials, including metal, plastic, foam, wood, and/or composite materials. The support 50 may also have a variety of shapes and sizes. For example, the support 50 in one practice application is made from square metal tubing having a width between 0.5-1 inches.

The support 50 comprises a pivot bracket 52, an upper section 58, and a lower section 60. The upper section 58 may be formed integrally with, or be connected to, the lower section 60. In an exemplary embodiment depicted in the drawings, the support 50 is telescopic. Any type of telescopic connection may be utilized, for example, one of the upper section 58 slides within the lower section 60 or, in the alternative, the lower section 60 slides within the upper section 58. An adjustable locking mechanism 61 retains the upper and lower sections 58, 60 in place relative to one another. The locking mechanism 61 may be, for example a notch, detent, pin, spring-loaded button, set screw, or other mechanism. Alternatively, the upper and lower sections 58, 60 may be threadably connected. Although not shown, the support 50 may further include one or more additional intermediate sections to allow the height of the support 50 to be adjusted over a wider range. The height of the support 50 may also be capable of moving during operation of the decoy 10. For example, the support 50 may be a hydraulic telescoping cylinder. The support 50, activated by a controller 24, may then be dynamically raised and lowered. This controller 24 may be the same one which controls the actuator 30, or it may be a separate unit. Movement of the support 50 causes corresponding raising and lowering of the decoy 10 attached to the support 50.

Figure 8:
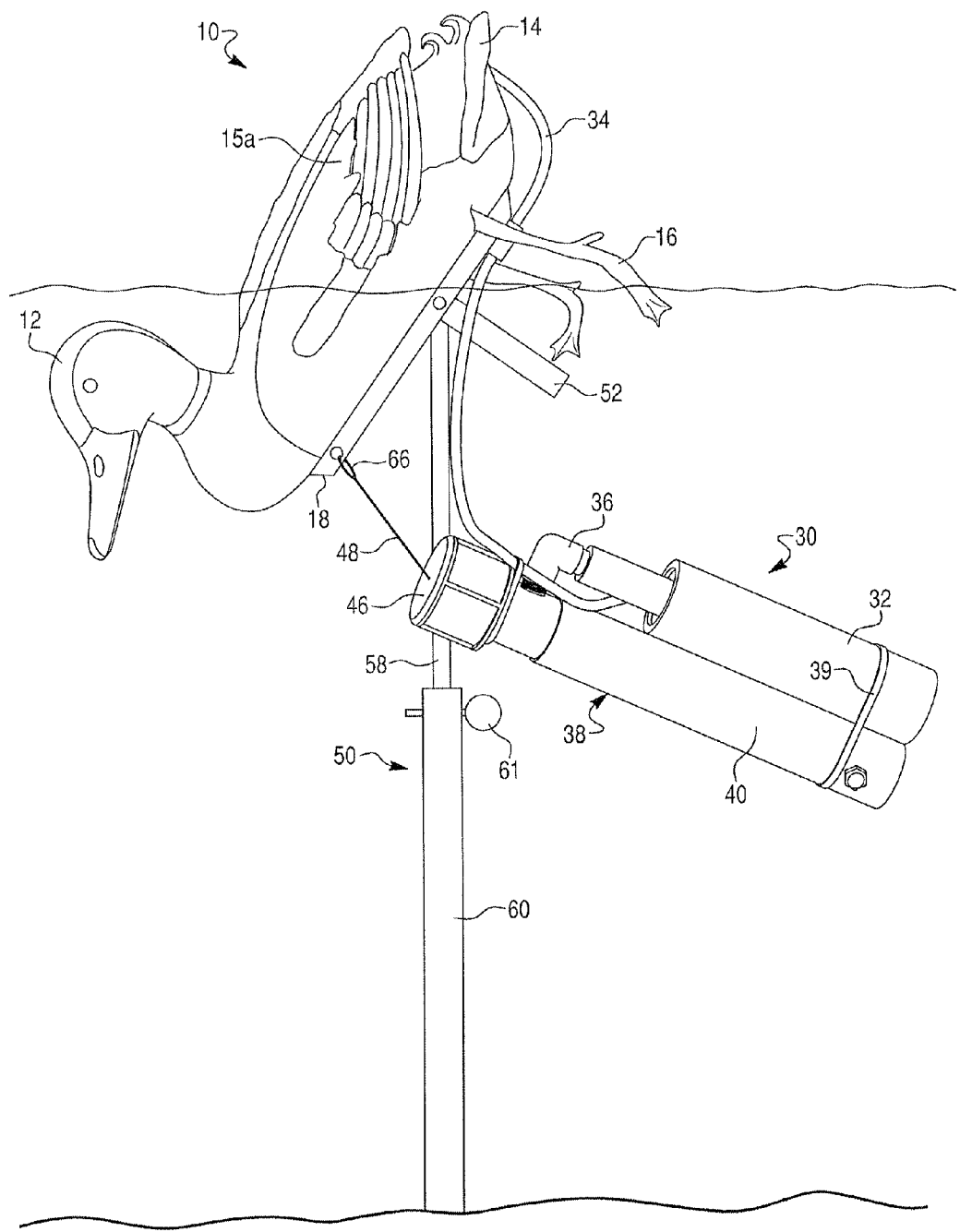
FIG. 8 is a perspective view similar to FIG. 7, but showing the waterfowl decoy in a partially submerged position.

The pivot bracket 52 connects the upper section 58 of the support 50 and to the base 18 of the decoy 10. As best shown in FIG. 8, the pivot bracket 52 allows the decoy 10 to pivot about the support 50. In an exemplary embodiment, the pivot bracket 52 is connected to the support 50 and the base 18 of the decoy 10 by stainless-steel, threaded bolt and locking nut. The pivot bracket 52 may be releasable connected to the upper section 58 and the base 18, for example, via removable pins. The pivot bracket 52 may also be formed integrally with, or permanently affixed to the upper section 58, the base 18, or to both.

As best shown in FIG. 5, the pivot bracket 52 has a substantially U-shaped cross section (viewed from above) defined by a pair of opposite sidewall portions 54 and a single endwall portion 56 connecting the sidewall portions 54. The sidewalls 54 have edges that are opposite and spaced apart from one another to establish an opening or slot through which the top end of the upper section 58 may be received. When the pivot bracket 52 is moved pivotally relative to the upper section 58 (as discussed in further detail below), the upper section 58 passes through the opening or slot between the edges of the opposite sidewall portions 54. Although not shown, the pivot bracket 52 may be designed to alternatively or additionally allow the decoy to pivot in both directions.

In an exemplary embodiment, the pivot bracket 52 is attached to the decoy 10 at a first position which allows up to ⅔ of the decoy 10 to be submerged in water and which is spaced from a second position where the actuator line 48 is attached to the decoy 10, as illustrated in FIGS. 6-10. While a pivot bracket 52 is shown and described, alternative manners of pivotally connecting the decoy 10 to the support member 50 may be utilized. For example, the pivot bracket 52 may be eliminated and the base 18 may be connected to the support member 50 by a simple pin. Implementation of various other types of pivoting connections between the decoy 10 and the support member 50 will be understood by one of ordinary skill in the art.

In addition to supporting the decoy 10, the support 50 may also hold, or assist in holding, the actuator 30. As best shown in FIG. 5, in the illustrated embodiment, the support 50 further includes a bracket 62 for retaining the actuator 30. While a single bracket 62 is depicted in FIG. 5, the support 50 may have more than one bracket 62, allowing the actuator 30 to be placed in a variety of positions or multiple actuators 30 to be attached to the support 50. The bracket 62 is designed to connect to the actuator 30, either through a permanent or releasable connection. The actuator 30 may be fixed to the bracket 62, or the connection may permit movement of the actuator 30 relative to the bracket 62. Optionally, the bracket 62 may allow a user to selectively position the actuator 30 relative to the support 50. The bracket 62 is depicted angled relative to the upper and lower sections 58, 60 of the support 50. In an exemplary embodiment, the bracket 62 is angled between 30° and 60° relative to the longitudinal axis of the support 50. In various exemplary embodiments, the movement of the decoy 10 correlates to an angle of the actuator 30 which provides greater efficiency, in terms of force required and wear on various components.

In various exemplary embodiments, the support 50 is designed to be placed into the ground, such as the bottom of the pond or lake of the target area. In such embodiments, the support 50 may have a hold 64 attached to either the upper or lower section 58, 60. Though the hold 64 may be located anywhere, it desirably is placed in such a position to avoid interference with the working components of the device, as well as the adjustability of the support 50, as necessary. A user may place a hand or foot on the hold 64 to apply a downward force to the support 50 and drive its lower end into the ground. Use of the hold 64 enables a user to apply greater force to drive the support 50 into the ground and helps avoid contact with working components, such as the decoy 10 and the actuator 30, when doing so. The hold 64 may be fixed, removable, or otherwise movably connected to the support 50.

Figure 6:
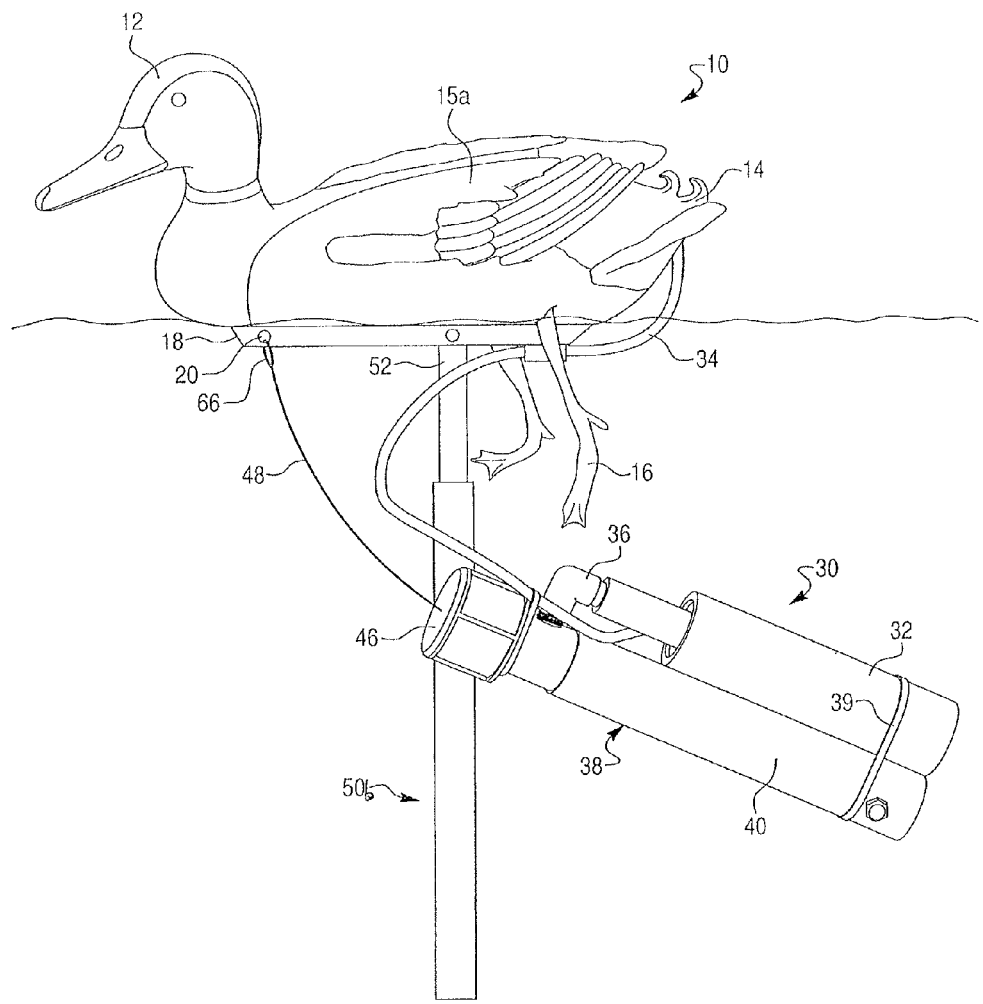
FIG. 6 is a perspective view of the waterfowl decoy of FIGS. 1 and 2 in operative association with the actuator of FIGS. 3 and 4 and a floating support.

In the exemplary embodiment shown in FIG. 6, the support 50b is designed to float with the decoy 10, as opposed to being anchored to the ground. Where the support 50b also acts as a flotation device, the support 50b may have only a single section, as the height will not need to be adjusted and a pivoting mechanism will not be needed. To achieve the appearance of a live waterfowl resting in the water, the support 50b may be made from an appropriate material, size, and weight. The support 50b may also include additional components, such as a float (not shown), as may be needed depending on the size, weight, and shape of the decoy 10 and actuator 30.

FIGS. 7-10 depict exemplary embodiments of the decoy in operation.

Figure 7:
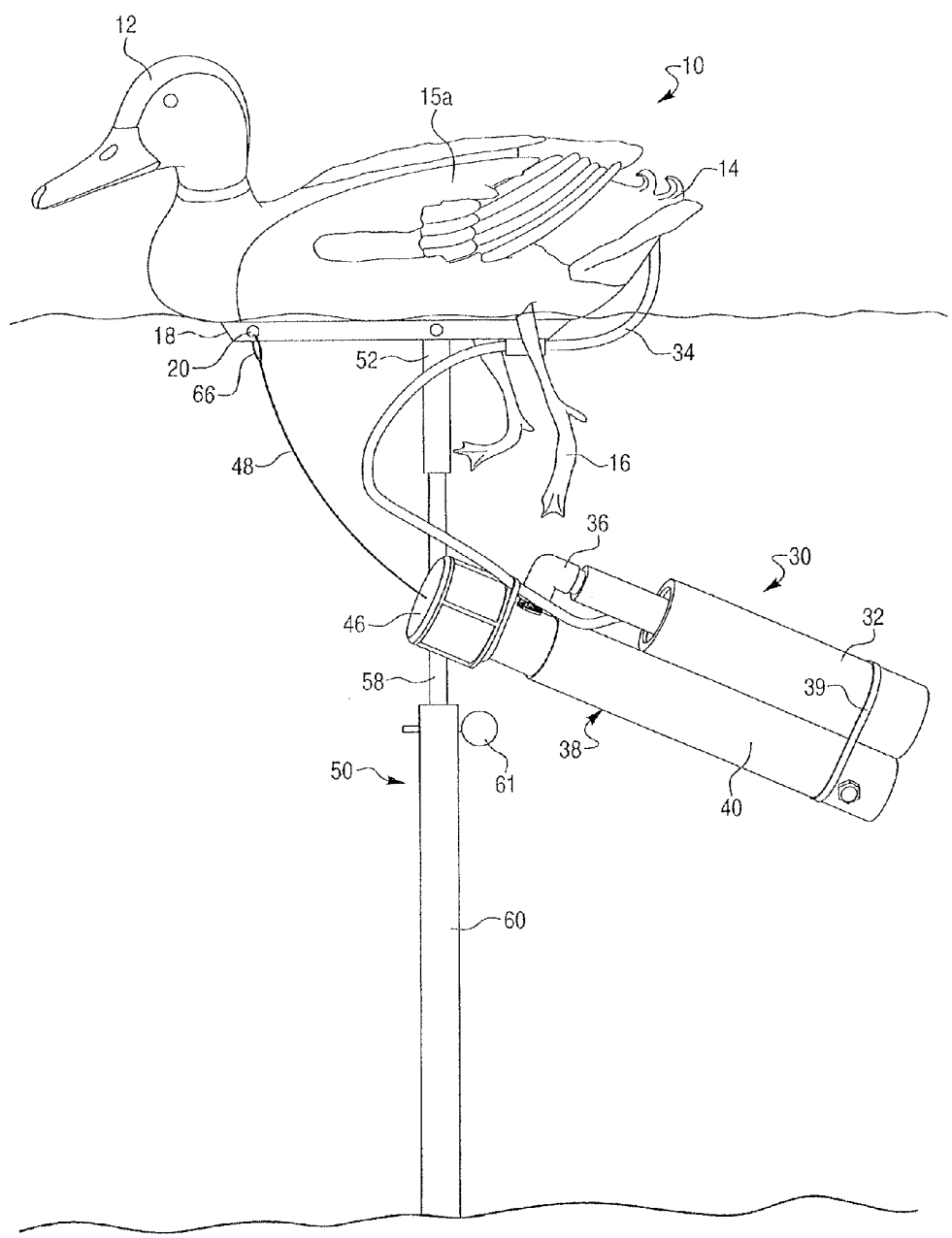
FIG. 7 is a perspective view of the waterfowl decoy of FIGS. 1 and 2 in operative association with the actuator of FIGS. 3 and 4 and an anchored support.

In the embodiment illustrated in FIG. 7, the base 18 of the decoy 10 is attached to the pivot bracket 52. The pivot bracket 52 is attached to the support 50, and the support 50 is anchored in the ground. The height of the support 50 is adjusted so that the decoy 10 appears to be floating in the water like a live bird. The actuator 30 is attached to the bracket 62 of the support 50. The actuator 30 is operatively connected to the decoy 10, for example through the actuator line 48. To prevent the actuator 48 from becoming twisted or tangled during operation of the decoy 10, a swivel 66 connects the base 18 of the decoy 10 to the actuator line 48. Upon activation of the pump by the controller, the actuator line 48 is drawn into the actuator 30, causing the decoy 10 to move. As best shown in FIG. 8, the tilting movement may involve submerging the head 12 of the decoy 10 into the water while raising the tail 14 to provide the appearance of the decoy 10 dabbling into the water, such as to feed. In various exemplary embodiments where the height of the support 50 is dynamically adjustable, after the actuator 30 causes the tipping motion the support 50 may be lowered to completely submerge the decoy 10, giving the appearance of the decoy 10 diving into the water. When the actuator 30 is deactivated, the decoy 10 is returned to a floating position. As discussed above, the amount and timing of this movement may be varied to mimic the movements of an actual animal.

While a single actuator 30 is associated with the embodiments shown in FIGS. 7-10, more than one actuator may be used depending on the size and weight of the decoy 10. For example, in an embodiment using a decoy 10 having the appearance of a goose, the decoy 10 will be significantly larger and thus require more force to move. To overcome the greater buoyancy of the goose decoy, the device may utilize two or more actuators 30. These actuators 30 may be attached to the support 50, through a single bracket 62 or through a pair of support brackets 62. A single actuator 30 having greater pulling force may also be used, such as by utilizing a pump 32 with a greater flow rate.

Figure 9:
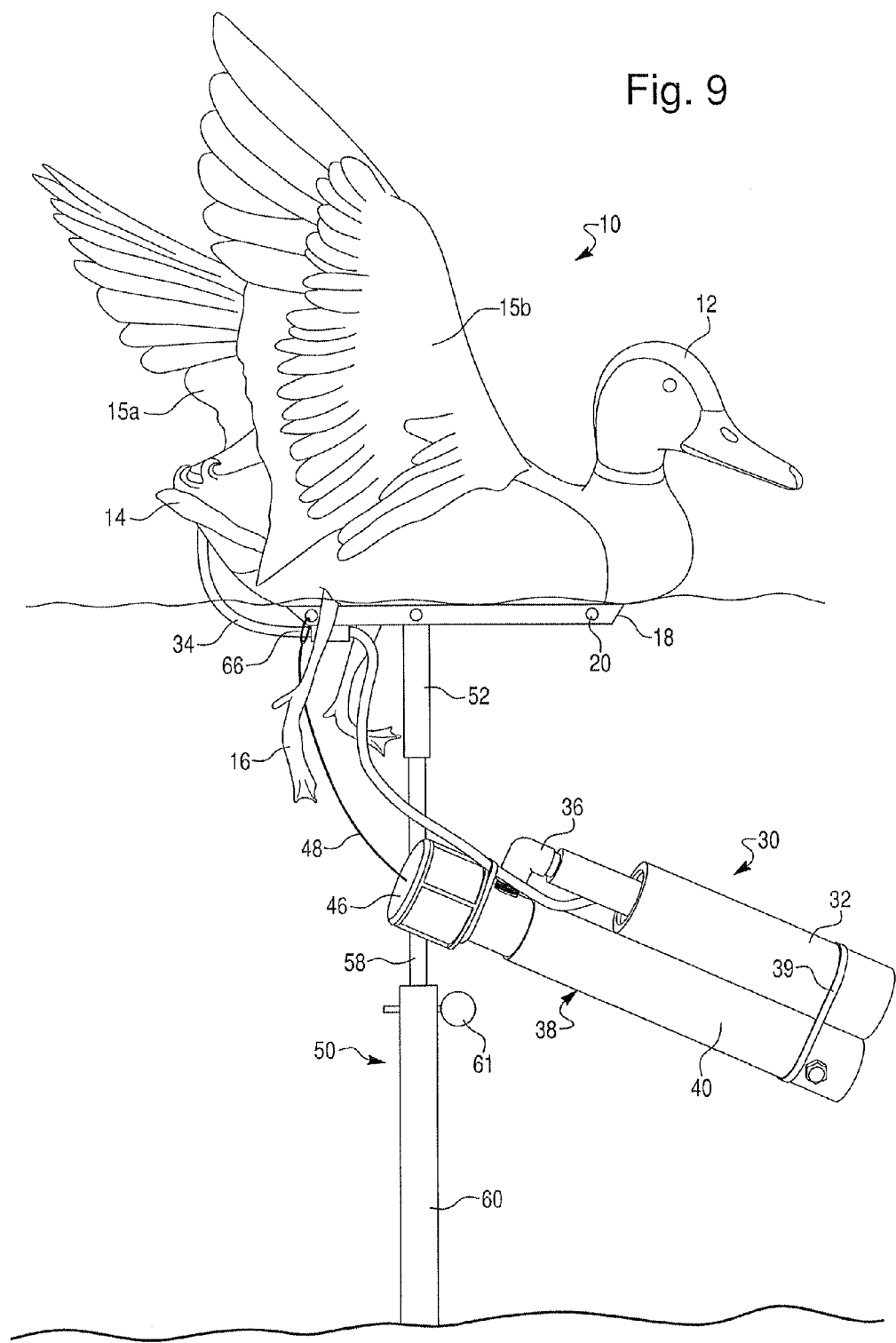
FIG. 9 is a perspective view the waterfowl decoy similar to that of FIGS. 1 and 2 in operative association with the actuator of FIGS. 3 and 4 and an anchored support.
Figure 10:
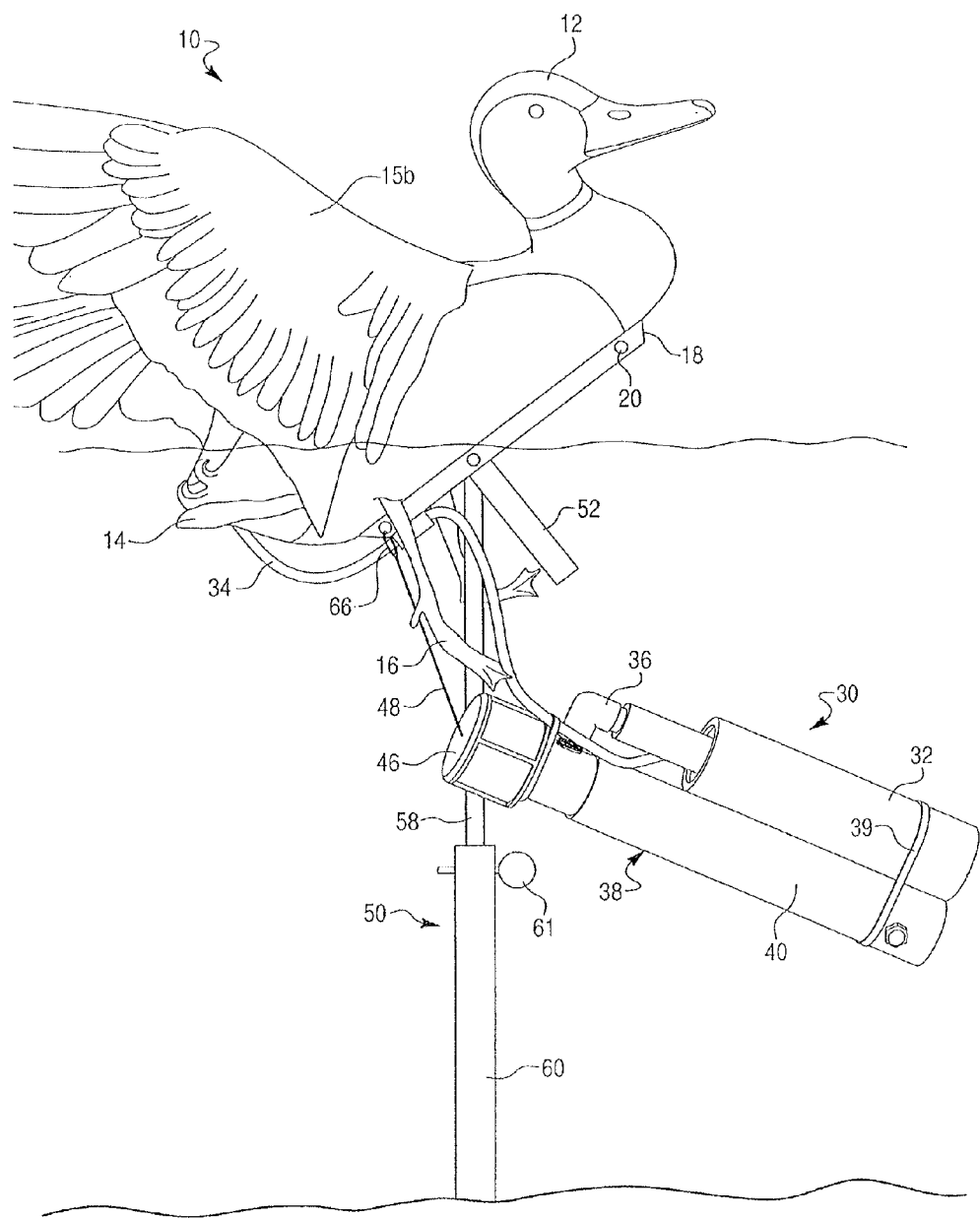
FIG. 10 is a perspective view similar to FIG. 9, but showing the waterfowl decoy in a partially submerged position.

FIGS. 9 and 10 depict an exemplary embodiment where the decoy 10 has a different type of movement than depicted in FIGS. 7 and 8. In FIGS. 9 and 10, the actuator line 48 is attached to the base 18 at the tail 14 end of the decoy 10. Upon activation, the actuator line 48 is drawn into the actuator 30, causing the tail 14 of the decoy 10 to move below the head 12 as the tail 14 is submerged in the water. This movement may mimic a waterfowl at rest and in a relaxed state.

Because the decoy 10 in FIGS. 9 and 10 is mimicking flight, it may be provided with outstretched wings 15b as opposed to folded wings 15a. The outstretched wings 15b may be attached in a manner which allows them to pivot, rotate, or otherwise move relative to the body of the decoy 10.

A motor, actuator, (not shown) or other components may be attached to the wings 15b to cause them to move. The controller 24 may be operable to correlate the movement of the wings 15b with the movement of the decoy 10.

The movement of the decoy 10 depicted in FIGS. 9 and 10 can be accomplished in a variety of ways. The decoy 10 may be rotated 180 degrees relative to the pivot bracket 52. Alternatively, the pivot bracket 52 may be removable from the upper section 58 of the support 50, thereby allowing the pivot bracket 52 (with the decoy 10 mounted thereon) to be rotated 180 degrees and reattached to the upper section 58. As discussed above, the support 50 may include more than one bracket 62, so that the actuator 30 may be moved instead of the decoy 10. In various other embodiments, the pivot bracket 52 may be designed to pivot in either direction, and a pulley (not shown) may be provided on the support 50. The actuator line 48 can then be connected to the front of the base 18, or it may be wound partially around the pulley and connected to the back of the base 18.

Figure 11:
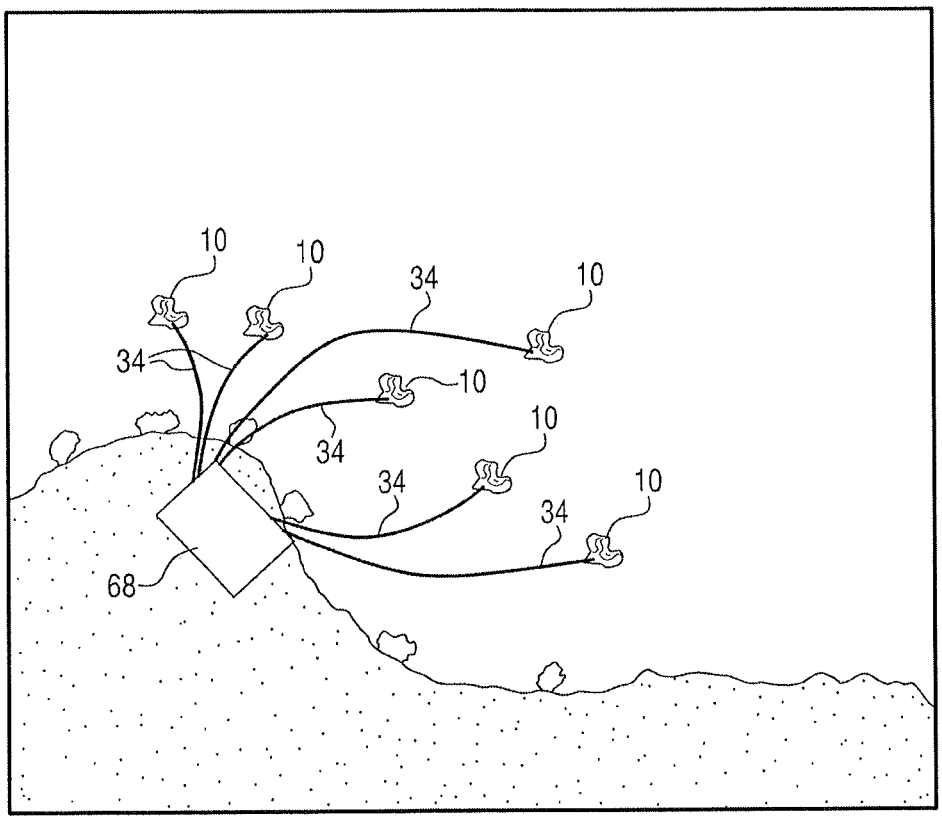
FIG. 11 is a view of exemplary moving decoys deployed in a hunting environment.

As discussed above, the actuator 30 is operably associated with the power supply 22 and the controller 24. In the embodiments shown in FIGS. 1-10, the controller and power supply are housed inside of the body of the decoy 10. Various other exemplary embodiments may have the power supply 22, the controller 24, and other components located in other places, for example, in or on the actuator 30 or the stand 50. As depicted in FIG. 11, the power supply 22, the controller 24, or both may be placed in a remote location from the decoy 10, for example with a user who is located inside of a hunting blind 68. In such an embodiment, the cable 34 has a sufficient length to allow the user to be distanced from the decoy 10 by, for example, at least 50 feet. As shown in FIG. 11, multiple decoys 10 may be used at a single time. Each decoy 10 may be connected to a common power supply 22 or each may have an individual, associated power supply 22. Preferably a plurality of decoys is arrayed in proximity, each of the decoys being actuable pursuant to an actuation sequence unique to the associated decoy. In an exemplary embodiment, a power supply 22 is housed in the body of each decoy 10, and only the controller 24 is placed in the hunting blind 68. The decoys 10 may have different types of movement, such as the dabbling type and flying type described above.

A user may control the decoys 10 in a variety of ways. Each decoy 10 may have a dedicated controller 24, which is activated by the user, for example by turning on the switch 26, and then left alone. When multiple decoys 10 are used with this example, different timing cycles may be provided for different decoys 10 so that the decoys 10 are not acting in unison. In another embodiment, each controller 24 may be activated by a master controller, which controls the activation of individual decoys 10. Similarly, a user may be provided with means to activate each decoy 10 individually, for example by choosing which decoy 10 to move and for how long. In another embodiment, a single controller 24 may be operably associated with multiple decoys 10. Alternatively, the controller 24 may also be eliminated, and the user can simply engage a switch 26 to supply power to an individual decoy 10 for a desired amount of time.

Though a wired connection is depicted in FIGS. 6-10, the controller 24 may be wirelessly connected to the decoys 10. This may be accomplished through a Wifi connection or through a radio controller. Additionally, a series of movements and timing may be preprogrammed, for example, using computer software, to create a movement pattern. This movement pattern may then be input or transmitted to the decoys 10.

As noted, in an exemplary embodiment, upon initiation, the controller 24 enters a cycle for pump 32 which has 4.5 seconds OFF, 0.9 seconds ON, 0.1 seconds OFF, and 0.2 seconds ON, after which the cycle repeats. During the initial ON phase, the pump 32 operates to draw water through open end 35 and pump it through conduit 36, which in turn causes piston 44 to move to the right (as viewed in FIG. 4), so that line 48 attached to hole 20 causes decoy 10, as shown in FIG. 7, to pivot downwardly. During the subsequent OFF phase, the pump 32 stops operating and the natural buoyancy of decoy 10 causes the decoy 10 to pivot on bracket 52 and appear to move its head upwardly. When pump 32 is activated again, then again pressurized water is forced through conduit 36 to again cause decoy 10 to pivot downwardly. Because the pump 32 is activated for a shorter period of time on the second activation, then the decoy 10 pivots less than originally occurred. The pump 32 is then deactivated, with the result that decoy 10 again appears to lift its head from the water. The pump 32 is then again activated to cause the decoy 10 to pivot downwardly into the water, The pump is then again deactivated, with the result that decoy 10 again appears to lift from the water. The end cap 46 thus serves to facilitate movement of the decoy 10, by limiting flow of water in order to cause the piston 44 to move upon activation of pump 32 and to also cause water to flow backwardly through pump 32 when the pump 32 is deactivated and the buoyancy of decoy 10 pulls line 48 and thus piston toward the left as viewed in FIG. 7. Those skilled in the art will recognize that the sequence and timing of the ON/OFF activation of pump 32 can be varied to modify the movement of decoy 10 as desired.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Additional embodiments are possible and are intended to be encompassed within this specification and the scope of the appended claims. The specification describes specific examples to accomplish a more general goal that may be accomplished in another way.

Only those claims which use the words "means for" are to be interpreted under 35 U.S.C. 112, sixth paragraph.

What is claimed is:

1. A waterfowl attraction apparatus, comprising:
   a decoy having opposite first and second ends;
   a support pivotally connected to the decoy;
   an actuator operatively associated with the decoy and disposed outside the decoy;
   a flexible actuator line connecting the actuator to the decoy;
   an electric power supply for powering the actuator; and
   an electronic controller for controlling the pivotal movement caused by the actuator;
   the actuator being operable upon activation to cause pivotal movement of the decoy by pulling the actuator line;
   the support attached to the decoy at a first position spaced from a second position where the actuator line is attached to the decoy;
   the actuator comprising an electric submersible pump and a piston connected to the actuator line.

2. The waterfowl attraction apparatus of claim 1, wherein the electric power supply and the electronic controller are housed in the decoy.

3. The waterfowl attraction apparatus of claim 1, wherein the electronic controller comprises an electronic timing circuit.

4. The waterfowl attraction apparatus of claim 1, wherein the actuator is mounted on the support.

5. The waterfowl attraction apparatus of claim 1, wherein the support comprises telescopic sections.

6. The waterfowl attraction apparatus of claim 1, wherein the actuator is operatively associated with the decoy to cause pivotal movement of the decoy by a sufficient degree to permit the head to submerge into the water.

7. The waterfowl attraction apparatus of claim 1, wherein the actuator is operatively associated with the decoy to cause pivotal movement of the decoy by a sufficient degree to permit the head of the decoy to rise above the tail.

8. The waterfowl attraction apparatus of claim 1, wherein a plurality of decoys are arrayed in proximity, each of the decoys being actuable pursuant to an actuation sequence unique to the associated decoy.

9. The waterfowl attraction apparatus of claim 1, further comprises a cable encasing at least one electrical wire electrically connecting the electric power supply to the actuator.

10. The waterfowl attraction apparatus of claim 1, further comprising a cable encasing at least one electrical wire electrically connecting the power supply to the electrical submersible liquid pump.

11. The waterfowl attraction apparatus of claim 1, further comprising a switch for activating the controller; the switch is mounted to the decoy and is electrically connected to the electric power supply and to the electronic controller.

12. A method of attracting waterfowl, comprising the steps of:

placing the waterfowl attraction apparatus of claim 1 in a body of water, and activating the actuator and thereby causing the decoy to pivot and to submerge at least one end of the decoy into the body of water.

13. The method of claim 12, including the step of:

Activating the actuator in accordance with a predetermined actuation sequence.

* * * * *